United States Patent
Dai

(10) Patent No.: US 6,616,586 B2
(45) Date of Patent: Sep. 9, 2003

(54) CONTAINER MANUFACTURING METHOD AND DEVICE

(76) Inventor: Wen-Long Dai, 11 Floor, No. 295-2, Ta Chin Street, Taichung (TW)

(*) Notice: Subject to any disclaimer, the term of this patent is extended or adjusted under 35 U.S.C. 154(b) by 0 days.

(21) Appl. No.: 10/183,653

(22) Filed: Jun. 28, 2002

(65) Prior Publication Data

US 2002/0193222 A1 Dec. 19, 2002

Related U.S. Application Data

(62) Division of application No. 09/749,534, filed on Dec. 28, 2000.

(51) Int. Cl.[7] ................................................. B31B 1/28
(52) U.S. Cl. ........................ 493/158; 493/58; 493/143; 264/320; 425/398
(58) Field of Search ...................... 493/158, 51, 58, 493/108, 159, 154, 143; 53/561; 264/119, 129, 320, 325; 425/398; 100/295

(56) References Cited

U.S. PATENT DOCUMENTS

| | | | | |
|---|---|---|---|---|
| 1,912,733 A | * | 6/1933 | Simmons | 493/152 |
| 2,136,308 A | * | 11/1938 | Miller | 493/152 |
| 2,642,916 A | * | 6/1953 | Exline, Jr. | 72/466.9 |
| 3,007,377 A | * | 11/1961 | Muller | 493/154 |
| 3,305,434 A | * | 2/1967 | Bernier et al. | 162/117 |
| 4,127,378 A | * | 11/1978 | Meadors | 425/398 |
| 4,149,841 A | * | 4/1979 | Patterson | 425/398 |
| 4,228,121 A | * | 10/1980 | Meadors | 264/291 |
| 4,459,909 A | * | 7/1984 | Takagi | 100/295 |
| 4,603,541 A | * | 8/1986 | Medwed | 53/561 |
| 4,832,676 A | * | 5/1989 | Johns et al. | 493/152 |
| 5,073,161 A | * | 12/1991 | Weder et al. | 493/154 |

* cited by examiner

Primary Examiner—Rinaldi I. Rada
Assistant Examiner—Louis Tran
(74) Attorney, Agent, or Firm—Rosenberg, Klein & Lee

(57) ABSTRACT

A container manufacturing method and device. The container manufacturing method includes steps of mixing, board-making, molding, guiding/crimping and demolding. Lower protruding guide bodies are arranged along the circumference of the mold cavity of the lower mold seat of the container manufacturing device at intervals. Upper protruding guide bodies are arranged on the press board and aimed at the intervals between the adjacent lower guide bodies. In the step of guiding/crimping, when the press board is pressed down by an oil pressure cylinder, the interlaced upper and lower guide bodies clamp and press the circumference of the board body to form regular crimps thereon. Therefore, when the upper mold block presses the board body into the mold cavity, the material can be evenly distributed and flowed so that the wall of the molded container can have uniform thickness.

3 Claims, 11 Drawing Sheets

CONTAINER MANUFACTURING METHOD AND DEVICE

This is a divisional of application Ser. No. 09/749,534, filed Dec. 28, 2000.

BACKGROUND OF THE INVENTION

The present invention is related to a container manufacturing method and device. In a step of guiding/crimping of the container manufacturing method, the circumference of a board material is formed with regular crimps. Therefore, when the board material is tensioned, squeezed and molded by a mold into a product, the wall of the product can have uniform thickness without easy breakage.

The conventional container manufacturing method includes seven steps of powdering, stirring, board-making, molding, drying, surface-treatment and further drying. The powdered chaff is mixed with an adhesive and stirred and then manufactured into a laminate material. The laminate material is twice punched and molded and heated and dried. Then the material is surface-treated and further dried.

When molded, a mold is used to directly punch the laminate material into a mold cavity. When the board-like laminate material is punched into the mold cavity to have a shape of basin, the circumferential wall of the basin will be formed with irregular large or small crimps as shown in FIG. 11. These irregular crimps lead to quite ununiform thickness of the circumferential wall. As a result, when the laminate material of the circumferential wall is squeezed and extended and plastically deformed by the mold, the difference of the thickness of the circumferential wall caused by the crimps will lead to breakage of the circumferential wall and defective product of container.

In order to solve this problem, the depth of the mold cavity is reduced and only a tray-like container with shallow depth can be made, while it is difficult to manufacture a bowl-like container with deeper depth.

Another measure for solving the problem of breakage is to greatly increase the ratio of the adhesive to the powdered chaff so as to enhance the viscosity and flowability of the laminate material. However, the cost for the adhesive is about several decades of times the cost for the chaff. Therefore, to solve the problem of breakage with such measure, the manufacturing cost for the product will be greatly increased. Moreover, the enhanced viscosity will lead to difficulty in demolding.

SUMMARY OF THE INVENTION

It is therefore a primary object of the present invention to provide a container manufacturing method and a device thereof. Lower protruding guide bodies are arranged along the circumference of the mold cavity of a lower mold seat at intervals and upper protruding guide bodies are arranged on the press board of the upper mold seat and aimed at the intervals between the adjacent lower guide bodies. When the press board is pressed down, the interlaced upper and lower guide bodies clamp and press the circumference of the board body to form regular crimps thereon. Therefore, the board body is pressed into the mold cavity and molded, the material of the board body can be evenly distributed so that the wall of the molded container can have uniform thickness without breakage.

It is a further object of the present invention to provide the above container manufacturing method and device in which the regular crimps and the upper and lower guide bodies cooperatively reduce the frictional force between the board body and the mold. Therefore, the tension exerted onto the board body by the mold is reduced so as to minimize the flowing area of the material when molded. Therefore, the punching operation can be speeded so as to promote manufacturing efficiency.

The present invention can be best understood through the following description and accompanying drawings wherein:

DETAILED DESCRIPTION OF THE PREFERRED EMBODIMENTS

Figure 1:
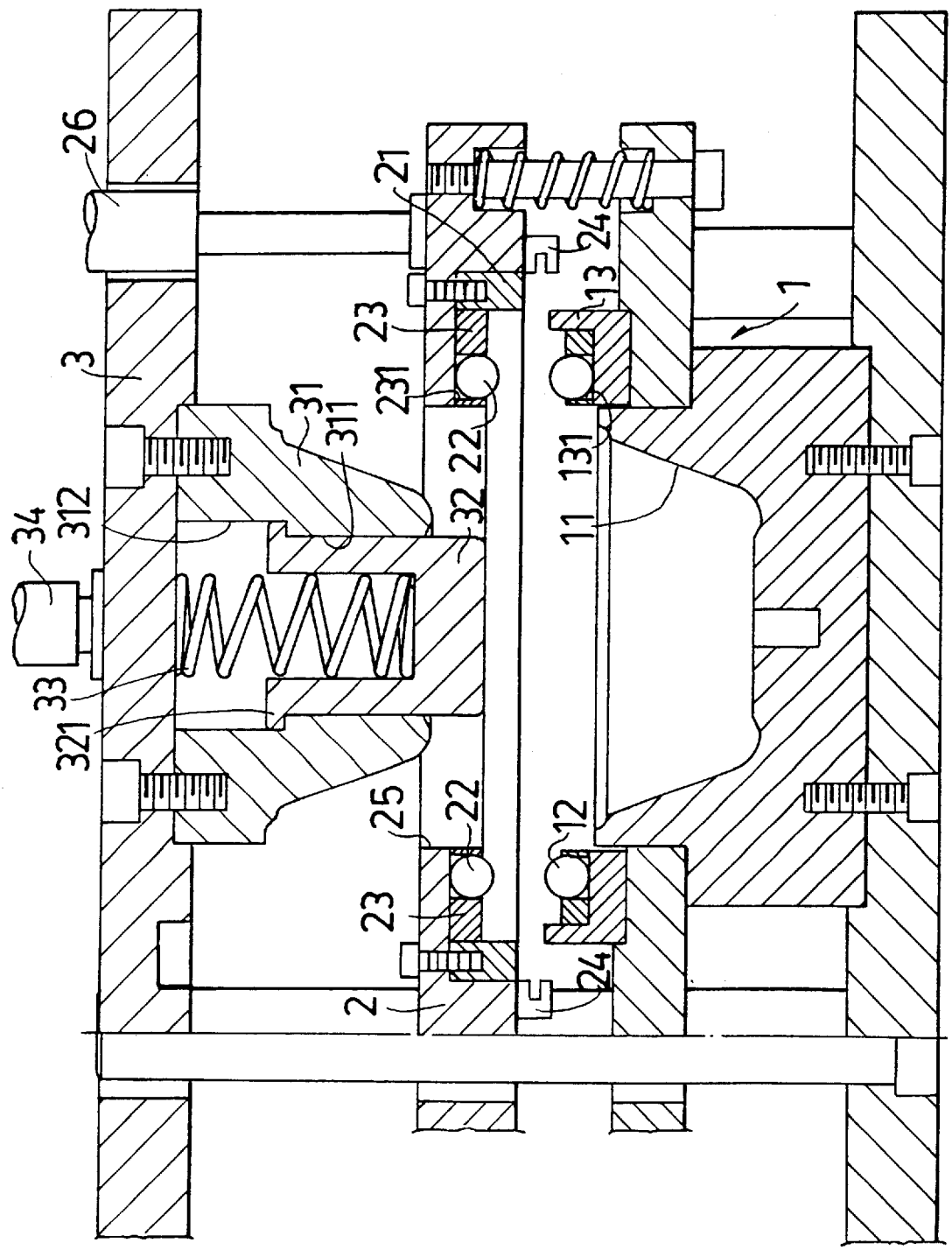
FIG. 1 is a sectional assembled view of the container manufacturing device of the present invention.
Figure 2:
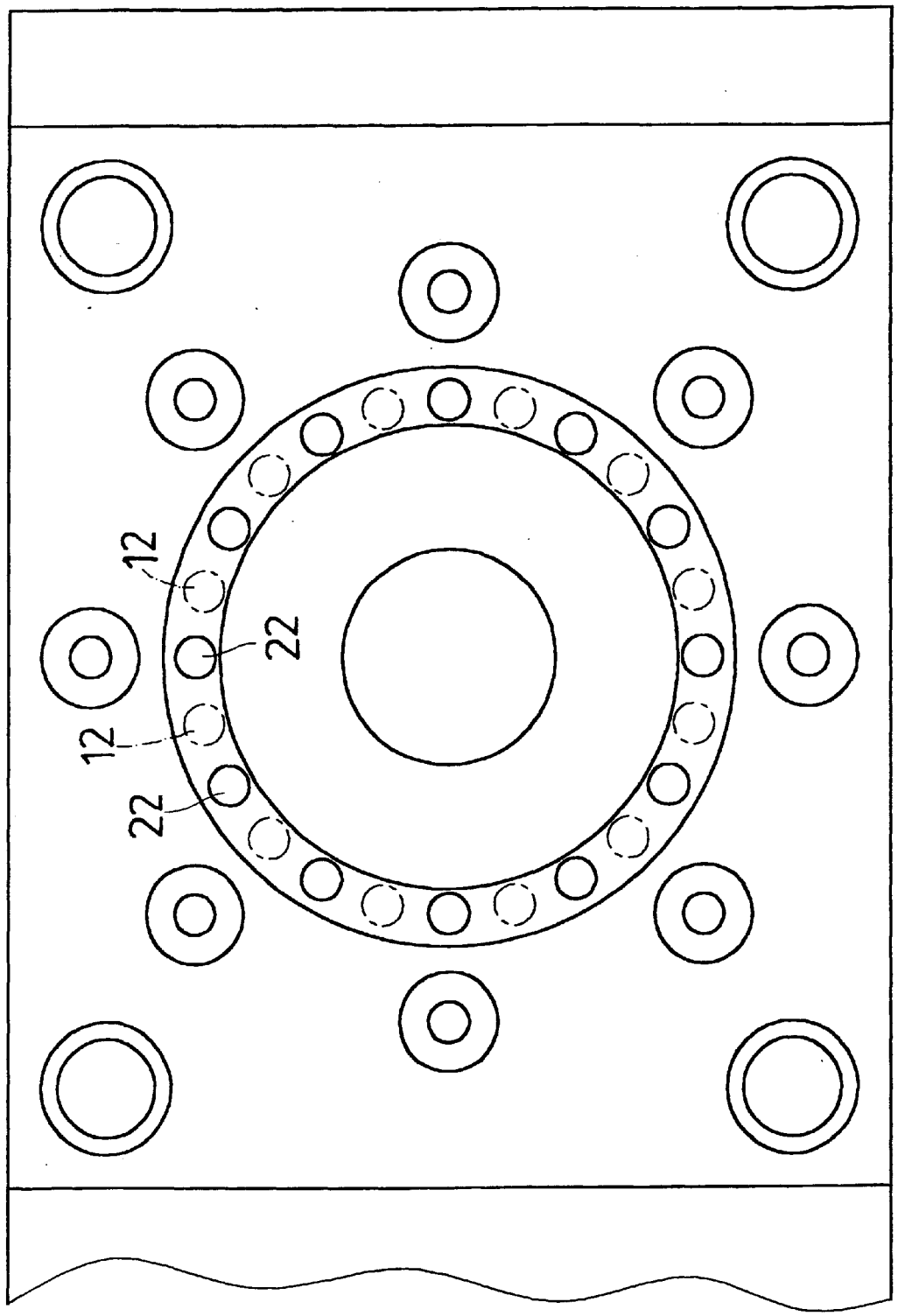
FIG. 2 is a top view showing that the upper and lower guide bodies of the present invention are interlacedly arranged.

FIGS. 1 to 8 show the container manufacturing method and device of the present invention. With reference to FIGS. 1 and 2, the device includes at least one lower mold seat 1 having a mold cavity 11. Multiple protruding lower guide bodies 12 are arranged along the circumference of the mold cavity 11 at intervals. In this embodiment, the lower guide bodies 12 are steel balls 12 which are fixed on the lower mold seat 1 by a lower fixing seat 13. The lower fixing seat 13 is formed with a substantially reverse trumpet-shaped dent 131 corresponding to each steel ball 12. The steel ball 12 is rollably positioned within the dent 131. A press board 2 is disposed on the lower mold seat 1. The press board 2 is formed with a cutting section 21 corresponding to the circumference of the lower mold seat 1. Multiple protruding upper guide bodies 22 are arranged on the press board 2 and aimed at the intervals between the adjacent steel balls 12. In this embodiment, the upper guide bodies 22 are steel balls 22 fixed on the press board 2 by an upper fixing seat 23. The upper fixing seat 23 is formed with a substantially trumpet-shaped dent 231 corresponding to each steel ball 22. The steel ball 22 is rollably positioned within the dent 231. The press board 2 has a retaining section 24 for retaining a board-shaped material. An upper mold seat 3 is disposed above the press board 2. The upper mold seat 3 has a projecting upper mold block 31 formed with a shape corresponding to the shape of the mold cavity 11 of the lower mold seat 1. The press board 2 is formed with a perforation 25 corresponding to the upper mold block 31. The upper mold block 31 can be pressed to pass through the perforation 25 into the mold cavity 11. The upper mold block 31 is formed with a central receptacle 311 having an upper large diameter section 312. A press block 32 is disposed in the receptacle 311. The press block 32 has a flange 321 engaged with the large diameter section 312. A spring 33 is positioned between the press block 32 and the upper mold seat 3 for pushing the press block 32 downward in normal state.

Figure 3:
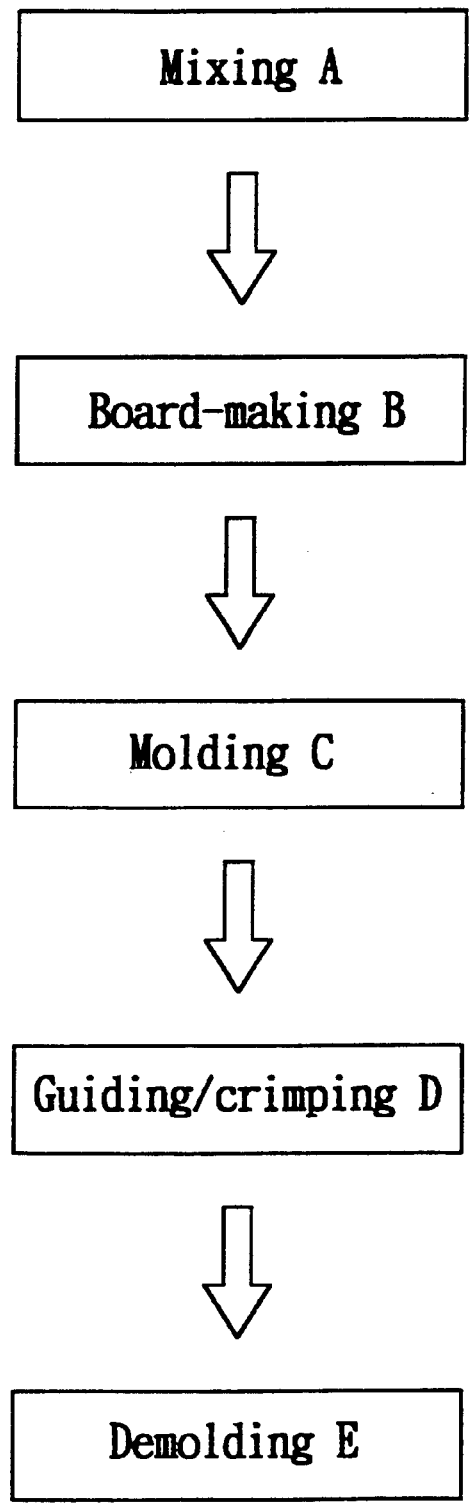
FIG. 3 is a flow chart of the container manufacturing method of the present invention.
Figure 4:
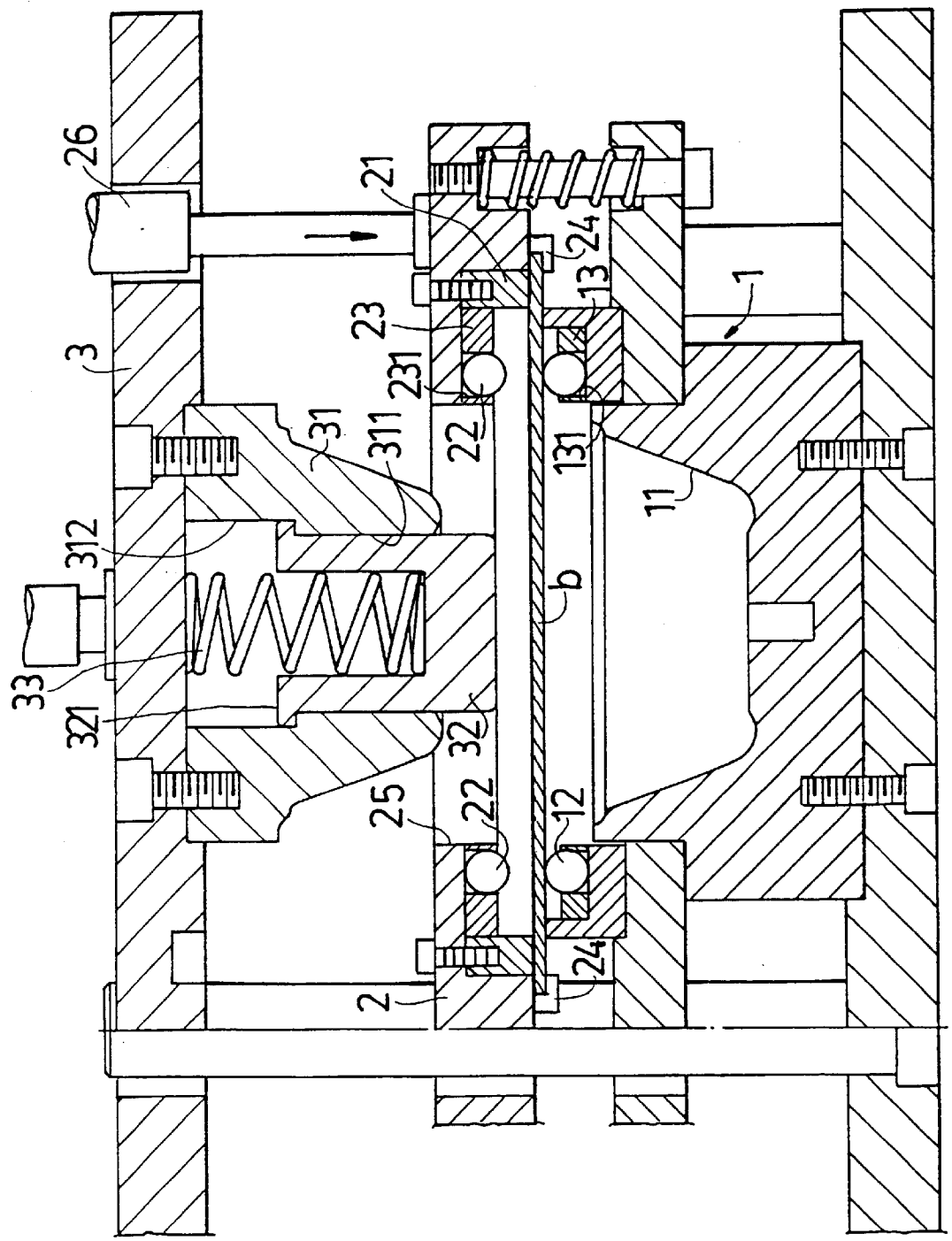
FIG. 4 is a sectional assembled view showing that the press board of the present invention cuts the board body.

As shown in FIG. 3, the container manufacturing method of the present invention includes steps of:

Mixing A: The powdered chaff is mixed with an adhesive at a certain ratio and evenly stirred;

Board-making B: The material of mixture of A is rolled into a board body b;

Molding C: The board body b is conveyed to the container manufacturing device to be rested on and retained by the retaining section 24 of the press board 2 as shown in FIG. 4. When punched, an oil pressure cylinder 26 is used to press down the press board 2. The cutting section 21 cuts the board body b into a predetermined shape. Then the oil pressure cylinder 34 drives the upper mold seat 3 to press down the upper mold block 31, whereby the upper mold block 31 presses the cut board body b into the mold cavity 11 of the lower mold seat 1 to form a container b'.

Figure 5:
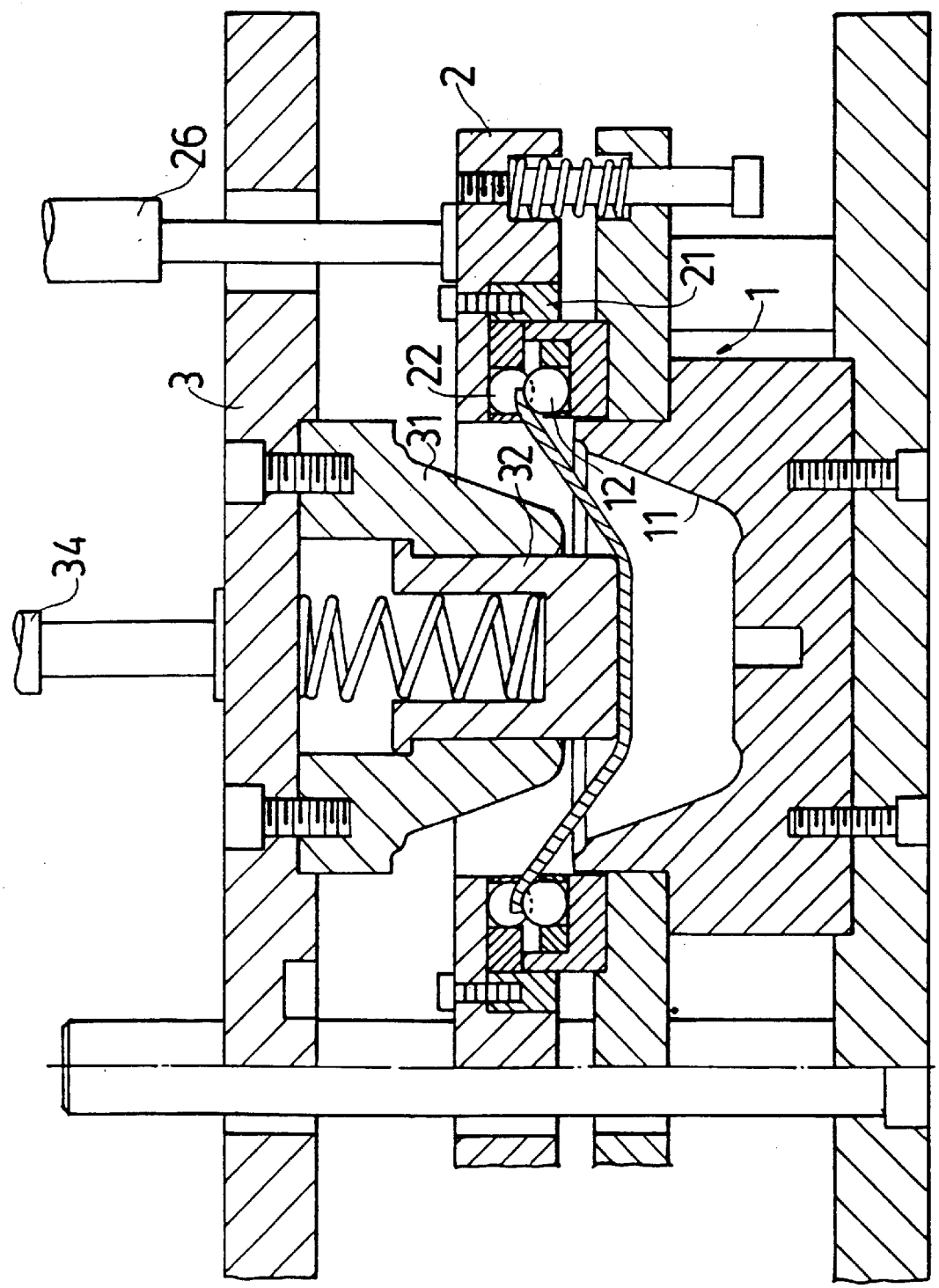
FIG. 5 is a sectional assembled view showing that the press block of the present invention presses the board body downward.
Figure 6:
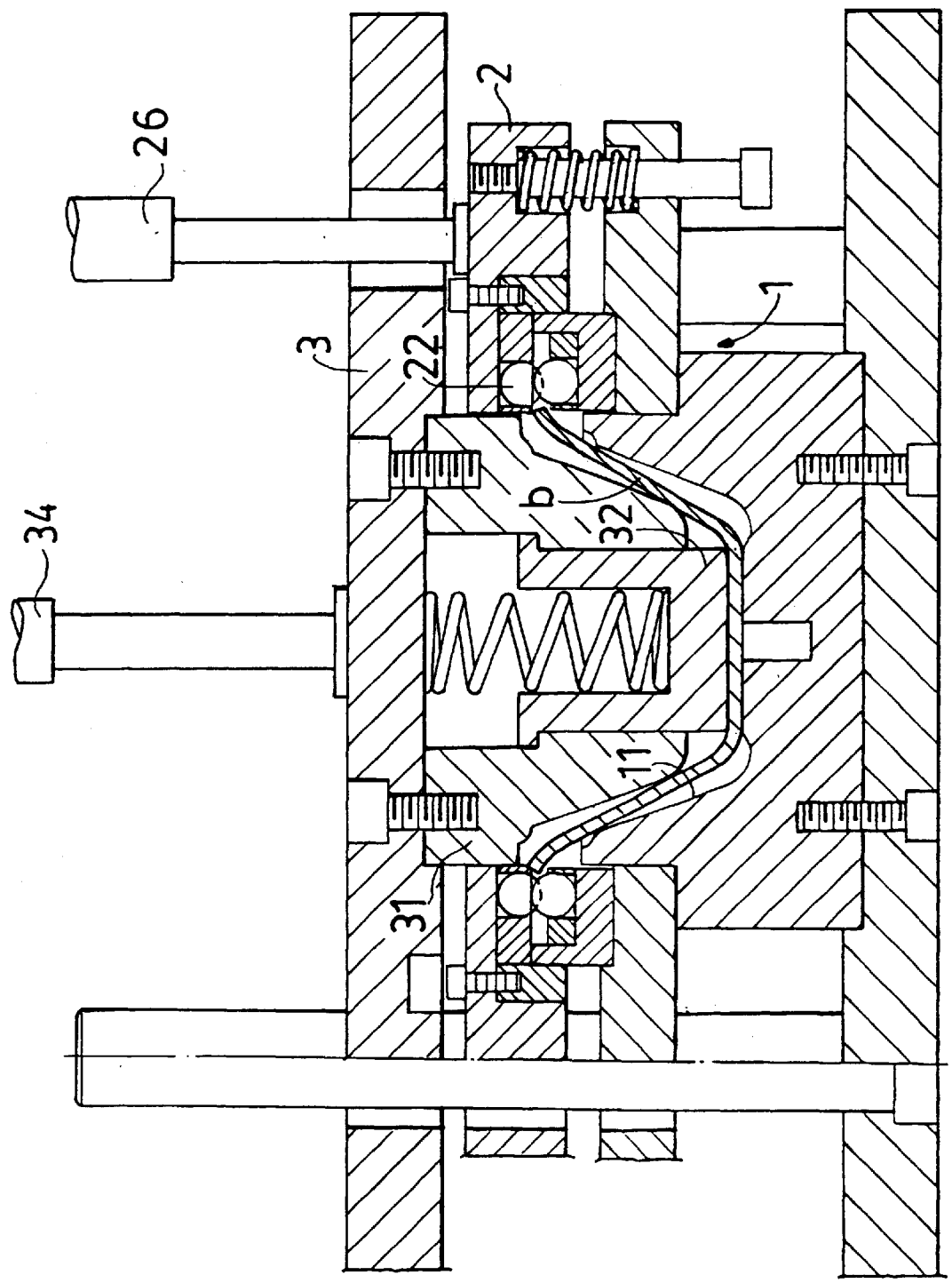
FIG. 6 is a sectional assembled view showing that the board body is molded and guided/crimped.
Figure 7:
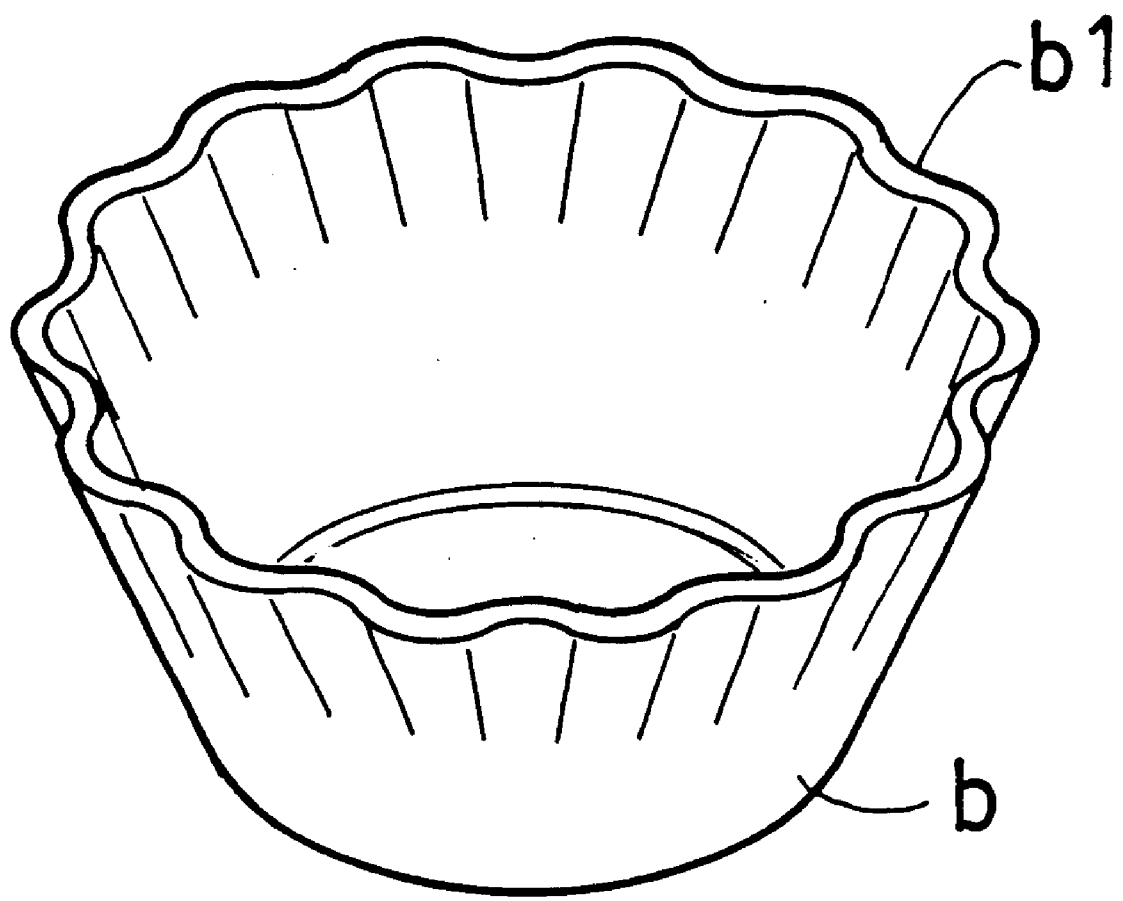
FIG. 7 is a perspective view of the molded and guided/crimped board body.
Figure 8:
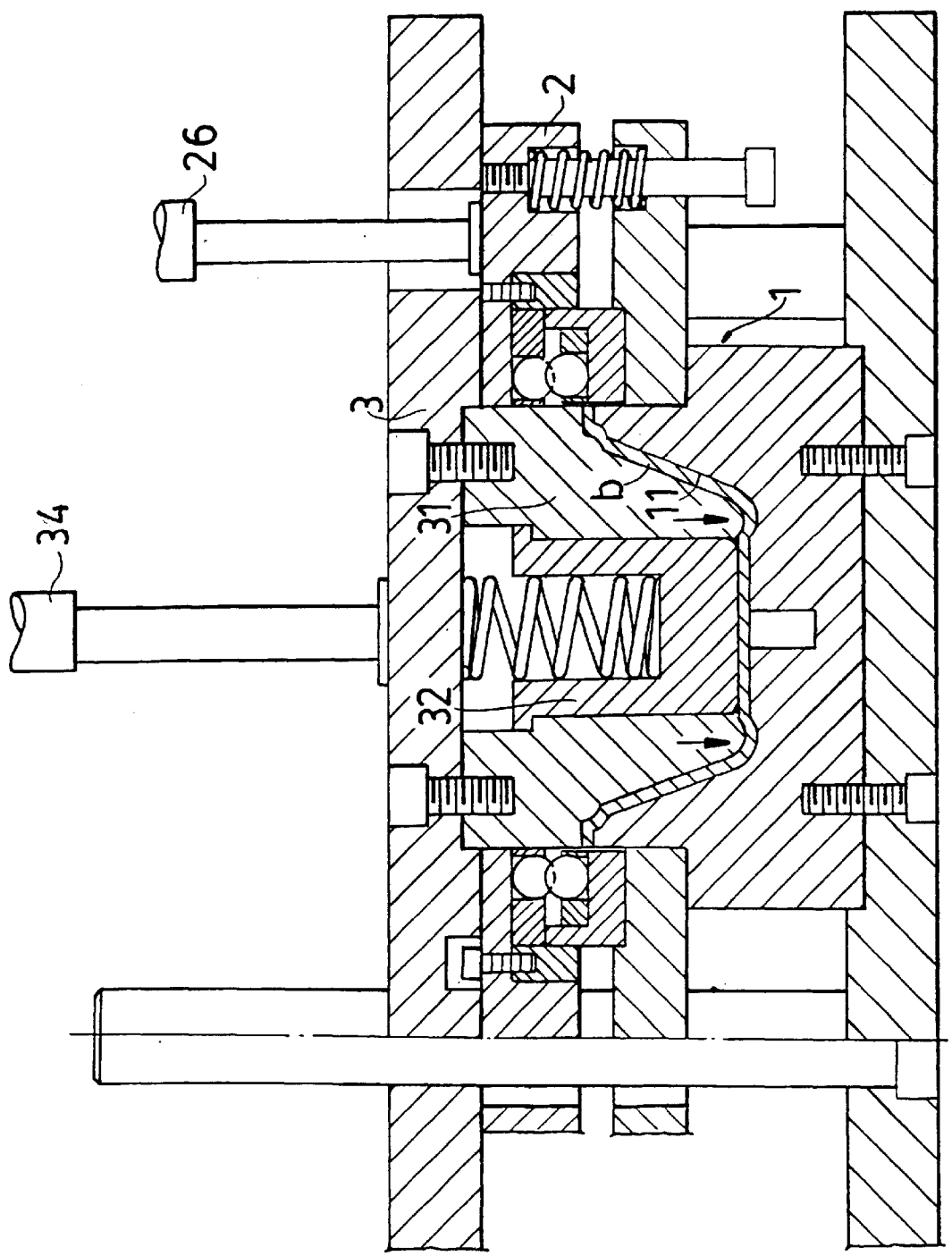
FIG. 8 is a sectional assembled view showing that the board body is molded.

Guiding/crimping D: In step C of molding, a guiding/crimping step D is further included. When the press board 2 is pressed down, the cutting section 21 serves to cut the board body b. In addition, the upper guide bodies (steel balls) 22 of the press board 2 and the lower guide bodies (steel balls) 12 arranged along the circumference of the mold cavity 11 will clamp the circumference of the board body b as shown in FIG. 5 so as to form regular crimps. When the oil pressure cylinder 34 drives the upper mold seat 3 to press down the upper mold block 31, the press block 32 of the upper mold block 31 will press the cut board body b into the mold cavity 11 of the lower mold seat 1. Under such circumstance, the board body b clamped by the upper and lower guide bodies (steel balls) 22, 12 is dragged downward. At this time, the board body b is only pressed by the press block 32 and the upper mold block 31 is not yet totally pressed into the mold cavity 11 as shown in FIG. 6. Accordingly, the circumference of the guided/crimped board body b which is pressed down into the mold cavity 11 is formed with regular crimps b1 as shown in FIG. 8. Therefore, when the upper mold block 31 presses the circumference of the board body b into the mold cavity 11, the regular crimps b1 thereof can be quickly and evenly squeezed and flowed. As a result, the wall of the container can have uniform thickness as shown in FIG. 7 without breakage.

Figure 9:
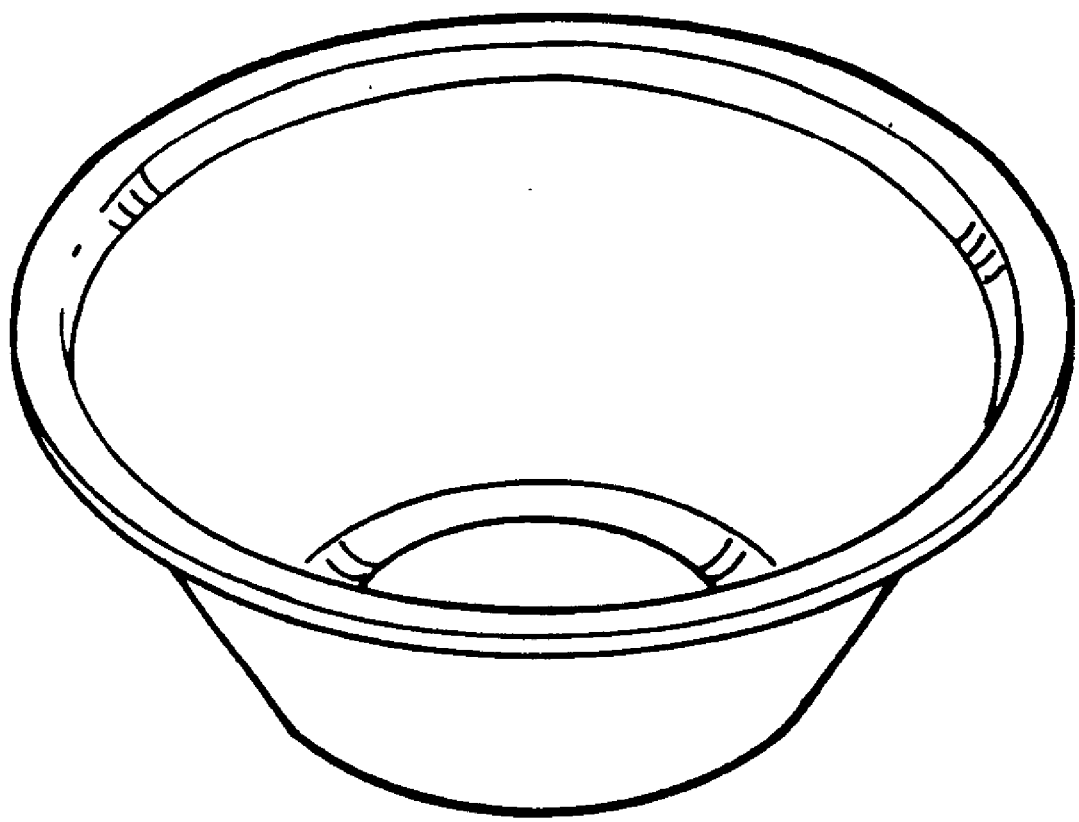
FIG. 9 is a perspective view of the completed container of the present invention.

Demolding E: The molded container b' is dried and demolded to complete the manufacturing procedure of the container b' as shown in FIG. 9.

The upper guide bodies (steel balls) 22 of the press board 2 and the lower guide bodies (steel balls) 12 arranged along the circumference of the mold cavity 11 are interlaced, whereby the circumference of the board body b is pressed and formed with regular crimps b1. When the upper mold block 31 presses the board body b into the mold cavity 11, the material can be evenly distributed and flowed. As a result, the wall of the container b' can have uniform thickness as shown in FIG. 7 without breakage. In addition, in step D of guiding/crimping, the regular crimps b1 and the upper and lower guide bodies (steel balls) 22, 12 cooperatively reduce the frictional force between the board body b and the upper mold block 31 and the mold cavity 11. Therefore, the tension exerted onto the board body b by the mold cavity 11 and the upper mold block 31 is reduced so as to minimize the flowing area of the material when molded. Therefore, the punching operation can be speeded so as to promote manufacturing efficiency.

Figure 10:
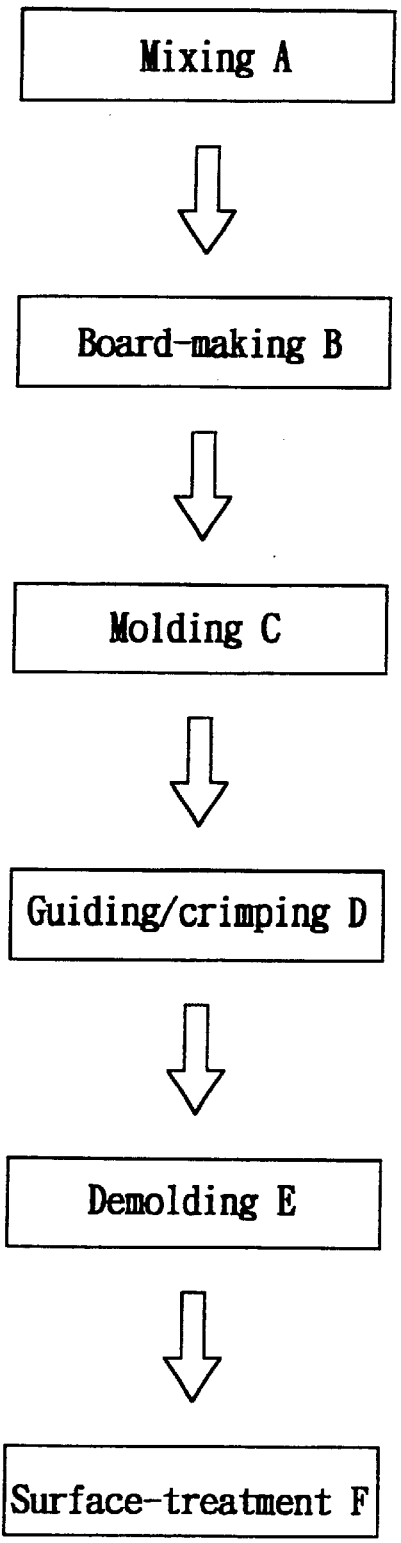
FIG. 10 is a flow chart of a second embodiment of the container manufacturing method of the present invention.
Figure 11:
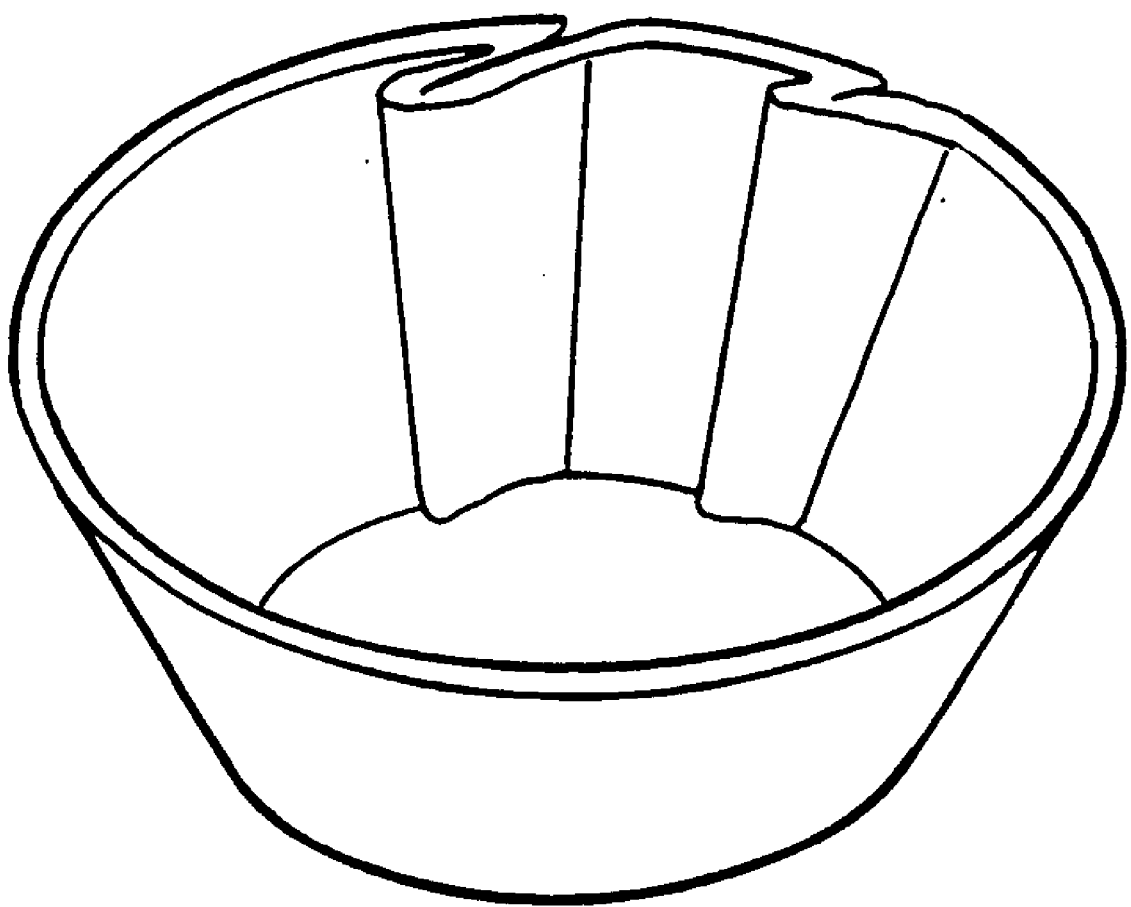
FIG. 11 is a perspective view of a container made by conventional manufacturing method and formed with irregular crimps.

FIG. 10 shows a second embodiment of the manufacturing method of the present invention, in which a step of surface-treatment F is further included. A layer of toxinfree and eatable paint is painted onto the surface of the container b' to make the container b more durable.

The above embodiments are only used to illustrate the present invention, not intended to limit the scope thereof. Many modifications of the above embodiments can be made without departing from the spirit of the present invention.

What is claimed is:

1. A container manufacturing device comprising at least one lower mold seat having a mold cavity, multiple protruding lower guide bodies being arranged along the circumference of the mold cavity at intervals, a press board being disposed above the lower mold seat, the press board being formed with a cutting section corresponding to the circumference of the lower mold seat, multiple protruding upper guide bodies being arranged on the press board and aimed at the intervals between the adjacent lower guide bodies of the lower mold seat, the lower guide bodies being steel balls which are fixed on the lower mold seat by a lower fixing seat, the lower fixing seat being formed with a substantially reverse trumpet-shaped dent corresponding to each steel ball, the steel balls being rollably positioned within the dent, the press board having a retaining section for retaining a board body, an upper mold seat being disposed above the press board, the upper mold seat having a projecting upper mold block formed with a shape corresponding to the shape of the mold cavity of the lower mold seat, the press board being formed with a perforation corresponding to the upper mold block, the upper mold block being pressed to pass through the perforation into the mold cavity, whereby when the press board is pressed down, the interlaced upper and lower guide bodies clamp and press the circumference of the board body to form regular crimps thereon.

2. A container manufacturing device as claimed in claim 1, wherein the upper guide bodies are steel balls fixed on the press board by an upper fixing seat, the upper fixing seat being formed with a substantially trumpet-shaped dent corresponding to each steel ball, the steel ball being rollably positioned within the dent.

3. A container manufacturing device as claimed in claim 1, wherein the upper mold block is formed with a central receptacle having an upper large diameter section, a press block being disposed in the receptacle, the press block having a flange engaged with the large diameter section, a spring being positioned between the press block and the upper mold seat for pushing the press block downward in normal state.

* * * * *